March 7, 1944.  N. H. VOLLÉ  2,343,250
BRAIN OBTENTION
Original Filed July 27, 1940
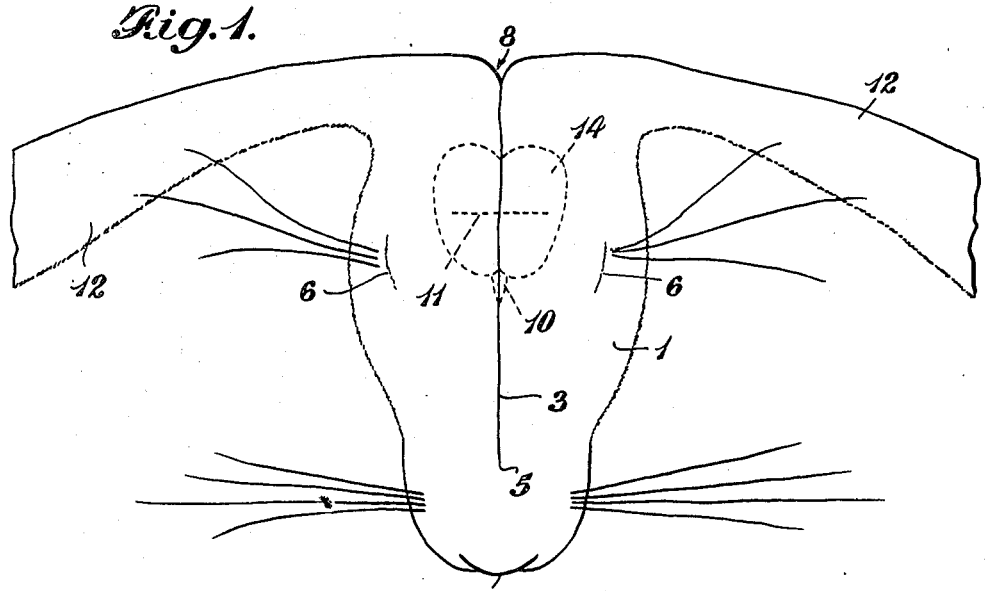
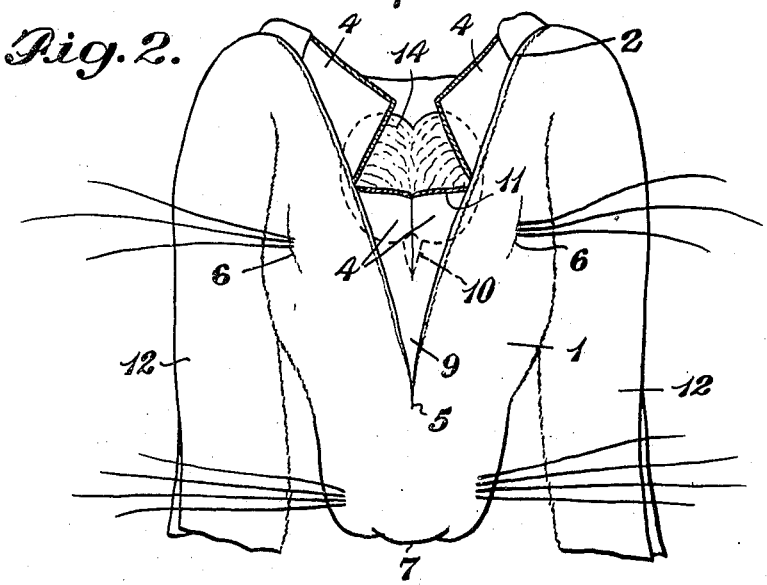
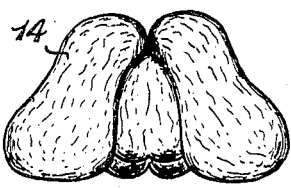
Inventor
N. H. VOLLE,
By Ayata Dowell
Attorney Patented Mar. 7, 1944

2,343,250

UNITED STATES PATENT OFFICE 2,343,250

BRAIN OBTENTION

Norbert H. Vollé, Cincinnati, Ohio, assignor to The Kroger Food Foundation, Cincinnati, Ohio Original application July 27, 1940, Serial No. 348,061. Divided and this application August 1, 1942, Serial No. 453,274

7 Claims. (Cl. 17—45)

This invention relates to blood analysis and more particularly to Thromboplastin or a substance used in the determination or diagnosis of hemorrhagic diathesis by the analytical determination of the prothrombin content of the blood in order to determine whether the blot will clot quickly and prevent undue bleeding or whether spontaneous hemorrhage will result.

The invention is particularly directed to the manufacture of Thromboplastin and the process of producing same from rodent brains such as rabbits, rats or the like, and more specifically to the removal or extraction of the brain utilized as a basis for such manufacture.

Various means have been employed in an attempt to determine the clotting time of blood and the prothrombin content thereof, with the result that a satisfactory product has been obtained as set forth for example in application S. N. 348,061, filed July 27, 1940, of which this application is a division.

In the above application there is described the production of Thromboplastin of a purity and character superior to anything heretofore attained and particularly appropriate and effective in determining the prothrombin content of the blood, which Thromboplastin is manufactured from rodent brains including brains of rabbits. There is also described in said earlier filed application a novel method of removing the brain from the animal completely and perfectly without injury thereto in order that it may be utilized in its entirety in the production of Thromboplastin without the incorporation of contaminating matter likely to impair the purity and efficacy of the product. There is also described in said earlier filed application the method or process of freeing the complete uninjured brain from meninges, blood clots or other extraneous substances, the utilization of which in the manufacture of Thromboplastin is undesirable.

This invention taken from the earlier application contemplates and has for its object the removal of the brain from the rabbit or other rodent or animal in a particular manner as a unit in a complete, perfect or uninjured condition in order that it may be completely utilized in the production of Thromboplastin of the highest quality devoid of adulterating or contaminating substance which might impair the efficacy of the Thromboplastin or reduce its lasting qualities or life.

A further object of the invention is to provide a novel process or technique, by means of which the skull of the animal may be opened readily and simply and the brain removed easily in substantially perfect condition.

Still another object of the invention is not only to remove the brain, but also removal of meninges, blot clots and the like from the brain.

Other objects, and the nature and advantages of the invention, will be apparent from the following description taken in conjunction with the accompanying drawing, wherein:

Fig. 1 is a front elevation of a rabbit head, showing the severance of the skin along its median line;

Fig. 2, is a similar front elevation, with the scalp open along the incisions, revealing the brain within its cavity; and Fig. 3, an elevation of the brain removed and slightly enlarged.

In carrying out the invention, the brain may be removed from the skull without removing the animal's head from its body, or thereafter. In either case the process is substantially the same.

Referring to the drawing, a rabbit head 1 having fur and skin 2, is cut along median line 3 of the skull to a point, beyond the eyes and approaching the nose 5. The relative position of the eyes and nose are shown as 6 and 7 respectively. Upon peeling back the fur and skin 2, thereby exposing skull 4 from the point of severance 8 to position 9 slightly beyond the eyes, the essential incisions are made. Utilizing bone scissors, the skull is cut along the median line 3 from the point of severance 8 to a point 10 which is approximately midway between the eyes. A horizontal incision 11 is then applied substantially bisecting the median line incision previously referred to. By applying vigorous force to ears 12 in opposing directions, the skull is easily opened; upon inverting or turning down the head, the brain material is readily and cleanly removed from its skull cavity. It should be noted that the brain 14, the outlines of which are defined by dotted lines, is drawn generally to actual size in Figs. 1 and 2; the indication of Fig. 3 is, however, somewhat enlarged. By proceeding in accordance with this technique, the bulbous brain mass is obtainable in its complete normal state, essentially free from blood clots, bruises and cuts.

Subsequent to the removal of the brain from its natural locale, it is essential to subject it to a so-called stripping treatment. In accordance with the prior art practice, resort was taken to the somewhat tedious utilization of sharp tweezers for removing the undesirable substances; the time necessitated for this manner of operation varied between 5 and 15 minutes. On the other hand, by the revised technique of the present invention, completely satisfactory results are attainable in approximately 2 minutes or less. This facilitated method utilizes the index finger and thumb of the right hand as the instruments for removing the meninges and pia matter, etc. The brain matter is preferably held in the palm of the left hand, and wetting by water the index finger and thumb aforementioned, they are passed over the brain surface to collect the meninges, blood clots, blood vessels, etc. After each passage of the thumb and index finger over the brain, they are immersed in a bath of cold water which immediately released into the water the adhering substances. Notwithstanding the simplicity of this system of treatment, it is very critical and permits stripping the entire brain, free and clean of adhering meninges, blood vessels or blood clots.

After the brain is removed and has received the appropriate treatment just described the brain mass is broken down and treated with acetone to form thromboplastin.

It will be obvious to those skilled in the art that various changes may be made without departing from the spirit of the invention and therefore the invention is not limited to what is shown in the drawing and described in the specification but only as indicated in the appended claims.

What is claimed is:

1. The method of obtaining a complete and uninjured animal brain which comprises stunning the animal with a blow insufficient to crush the skull, severing the skin and fur along the median line of the head to a point beyond the eyes and approaching the nose, rendering an incision of the skull along said median line to a point substantially between the eyes, rendering a horizontal incision of the skull substantially bisecting said median line incision, exerting a substantial force on the ears of the rabbit in opposing directions to open the skull, and inverting the open skull to permit the brain to emerge from its cavity.

2. The method of removing an animal brain from its skull cavity which comprises rendering an incision of the skull along its median line to a point substantially between the eyes, rendering a horizontal incision of the skull substantially bisecting said median line incision, exerting a substantial force on the ears of the rabbit in opposing directions to open the skull, and inverting the open skull to permit the brain to emerge from its cavity.

3. The method of removing an animal brain from the head of the animal which comprises making crossing incisions in the animal's skull over the brain cavity, pulling the ears apart to open the skull and inverting the skull to permit the brain to drop out.

4. The method of obtaining a complete and uninjured animal brain which comprises decapitating the animal, severing the skin and fur along the median line of the head to a point beyond the eyes and approaching the nose, rendering an incision of the skull along said median line to a point substantially between the eyes, rendering a horizontal incision of the skull substantially bisecting said median line incision, exerting a substantial force on the ears of the rabbit in opposing directions to open the skull, and inverting the open skull to permit the brain to emerge from its cavity.

5. The method of obtaining a complete and uninjured animal brain which comprises severing the skin and fur along the median line of the head to a point beyond the eyes and approaching the nose, rendering an incision of the skull along said median line to a point substantially between the eyes, rendering a horizontal incision of the skull substantially bisecting said median line incision, exerting a substantial force on the ears of the rabbit in opposing diretcions to open the skull, and inverting the open skull to permit the brain to emerge from its cavity.

6. The method of obtaining a complete and uninjured animal brain which comprises stunning the live animal with a blow on the head insufficient to crush the skull or injure the brain, then severing the hide along the median line of the top of the head between the eyes and to a position approaching the nose, making an incision in the skull along said median line to a position substantially between the eyes, making a horizontal incision in the skull substantially bisecting the median line incision, pulling the ears of the animal in opposite directions to open the skull, and inverting the open skull to permit the brain to drop from its cavity.

7. The method of obtaining a complete and uninjured animal brain which comprises decapitating the animal, then severing the hide along the median line of the top of the head between the eyes and to a position approaching the nose, making an incision in the skull along said median line to a position substantially between the eyes, making a horizontal incision in the skull substantially bisecting the median line incision, pulling the ears of the animal in opposite directions to open the skull, and inverting the open skull to permit the brain to drop from its cavity.

NORBERT H. VOLLÉ.